US010762666B2

(12) United States Patent
Cheng et al.

(10) Patent No.: US 10,762,666 B2
(45) Date of Patent: Sep. 1, 2020

(54) COLOUR GRADING PROCESS AND SYSTEM FOR DIAMONDS

(71) Applicant: Goldway Technology Limited, Central (HK)

(72) Inventors: Ka Wing Cheng, New Territories (HK); Kin Wing Wong, New Territories (HK); Kong Chan, New Territories (HK); Juan Cheng, New Territories (HK); Wing Chi Tang, New Territories (HK); Koon Chung Hui, New Territories (HK)

(73) Assignee: Goldway Technology Limited, Hong Kong (HK)

( * ) Notice: Subject to any disclaimer, the term of this patent is extended or adjusted under 35 U.S.C. 154(b) by 46 days.

(21) Appl. No.: 16/237,119

(22) Filed: Dec. 31, 2018

(65) Prior Publication Data

US 2019/0213757 A1 Jul. 11, 2019

(30) Foreign Application Priority Data

Dec. 29, 2017 (HK) .................................. 17113981.5
Feb. 5, 2018 (HK) .................................. 18101759.9

(51) Int. Cl.
*G06T 7/90* (2017.01)
*G01N 21/87* (2006.01)

(52) U.S. Cl.
CPC .............. *G06T 7/90* (2017.01); *G01N 21/87* (2013.01)

(58) Field of Classification Search
CPC . G06T 7/90; G06T 7/60; G01N 21/87; G01N 21/01; G01N 21/88; G01N 21/8806;
(Continued)

(56) References Cited

U.S. PATENT DOCUMENTS 6,239,867 B1 5/2001 Aggarwal
6,473,164 B1 10/2002 De Jong et al.
(Continued)

FOREIGN PATENT DOCUMENTS

CN 1398346 A 2/2003
CN 101539530 A 9/2009
(Continued)

OTHER PUBLICATIONS

Fan, Wei, Authorized Officer, National Intellectual Property Administration, PRC, "International Search Report" in connection with related International Application No. PCT/CN2018/125091, dated Feb. 27, 2019, 12 pgs.
(Continued)

*Primary Examiner* — Michael S Osinski
(74) *Attorney, Agent, or Firm* — Kolisch Hartwell, P.C.

(57) ABSTRACT

A computerized system for grading the colour of a diamond, wherein the colour of the diamond is graded based on a predetermined threshold of correlation of colour of a diamond with the colour of a diamond of a plurality of diamonds each having a colour grading assigned thereto, the computerized system including: an optical image acquisition device for acquiring at least a first optical image of a diamond, wherein the first optical image is acquired at a predetermined angle of inclination to the central axis extending normal to the table and through the apex of the pavilion of the diamond and in a direction of towards the table and wherein the first optical image is acquired in an environment having a predetermined constant light level; a processor module for comparing data derived from acquisition of the at least a first optical image with a plurality of data sets each of which corresponds to a diamond of a plurality of diamonds, wherein data sets are each derived from an optical image acquired by an optical image acquisition device in an
(Continued)

environment having a predetermined constant light the same as that as (i) and each of the data sets is assigned a colour grading, and wherein said data derived from acquisition of the at least a first optical image and the data of said data sets is data indicative of the colour of the diamond from which it is acquired; and an output module, for responsive to a predetermined threshold of correlation between the data derived from input of the first optical image and one of the plurality of data sets, providing an output signal indicative of the colour grade of the diamond.

22 Claims, 6 Drawing Sheets

(58) Field of Classification Search
CPC .... G01N 21/00; G01N 21/255; G01N 33/381; H04N 5/2256; H04N 5/23245; H04N 5/2252; H04N 5/2259; H04N 5/232; H04N 5/23216; G06K 9/00577; G06K 9/209; G06K 9/52; G06K 9/6202; G06K 9/627; G06K 9/629
See application file for complete search history.

(56) References Cited

U.S. PATENT DOCUMENTS

| | | | |
|---|---|---|---|
| 7,580,118 B2* | 8/2009 | Sasian | G01N 21/87 356/30 |
| 8,639,479 B2* | 1/2014 | Sivovolenko | G06T 17/20 703/2 |
| 9,008,832 B2 | 4/2015 | Lo | |
| 9,519,961 B2* | 12/2016 | Schnitzer | G01N 21/87 |
| 9,625,393 B2* | 4/2017 | Smith | G01N 21/87 |
| 9,678,018 B2* | 6/2017 | Takahashi | G01N 21/255 |
| 10,387,723 B2* | 8/2019 | Navot | G06K 9/627 |
| 2004/0072137 A1* | 4/2004 | Lapa | G09B 25/00 434/386 |
| 2005/0103840 A1 | 5/2005 | Boles | |
| 2005/0190356 A1* | 9/2005 | Sasian | G01N 21/01 356/30 |
| 2007/0043587 A1* | 2/2007 | Reinitz | G06Q 50/22 705/2 |
| 2007/0153256 A1 | 7/2007 | Liu | |
| 2008/0123076 A1* | 5/2008 | Sasian | G02B 27/0012 356/30 |
| 2009/0290141 A1 | 11/2009 | Friedman | |
| 2012/0274751 A1* | 11/2012 | Smith | G01N 21/87 348/52 |
| 2014/0063485 A1* | 3/2014 | Palmieri | G01N 21/87 356/30 |
| 2014/0229140 A1* | 8/2014 | Levami | G01N 21/87 702/179 |
| 2016/0004926 A1* | 1/2016 | Kerner | G06K 9/2027 348/46 |
| 2016/0103078 A1* | 4/2016 | Smith | G01N 33/381 356/30 |
| 2016/0232432 A1 | 8/2016 | Regev | |
| 2016/0290930 A1* | 10/2016 | Takahashi | G01N 21/255 |
| 2016/0320312 A1* | 11/2016 | Kolomenkin | G01N 21/87 |
| 2017/0241913 A1* | 8/2017 | Gu | G01N 21/87 |
| 2018/0082116 A1* | 3/2018 | Navot | G06K 9/6202 |
| 2018/0213897 A1* | 8/2018 | Yun | A44C 15/0015 |
| 2020/0011807 A1* | 1/2020 | Holloway | G01N 21/87 |
| 2020/0050834 A1* | 2/2020 | Niskanen | G06K 9/209 |
| 2020/0057001 A1* | 2/2020 | Kerner | G01N 21/87 |

FOREIGN PATENT DOCUMENTS

| | | |
|---|---|---|
| CN | 102596433 A | 7/2012 |
| CN | 103090973 A | 5/2013 |
| CN | 104949925 A | 9/2015 |
| CN | 104964979 A | 10/2015 |
| CN | 106662535 A | 5/2017 |
| CN | 107621465 A | 1/2018 |
| JP | H11255511 A | 9/1999 |
| TW | 201640096 A | 11/2016 |
| WO | 2007069242 A1 | 6/2007 |
| WO | 2016161014 A1 | 10/2016 |

OTHER PUBLICATIONS

Ren, Zhiguo et al., "Diamond Color Grading Based on Machine Vision", 2009 IEEE 12th Internationa Conference on Computer Vision Workshops, ICCV Workshops, Sep. 27, 2009, pp. 1970-1976.

European Patent Office, "Extended European Search Report" in connection with related European Patent Application No. 19150111.3, dated May 9, 2019, 9 pgs.

* cited by examiner

COLOUR GRADING PROCESS AND SYSTEM FOR DIAMONDS

TECHNICAL FIELD

The present invention relates to a system and a process for ascertaining colour of a gemstone. More particularly, the present invention provides a system and a process for ascertaining colour of a diamond.

BACKGROUND OF THE INVENTION

Diamonds are a key component utilized in luxury goods, in particular in articles of jewelry, and can have a very great value. The value of a diamond depends on several physical properties of the diamond.

There are four globally accepted standards utilized to assess the quality of a diamond, typically known as the 4C's, which are Clarity, Colour, Cut and Carat Weight. For a diamond, with the exception colour of a diamond which may have a particular or fancy colour, the value of a diamond is highly dependent on what is known as its colourlessness. The more colourless the diamond, the higher.

By way of example, the Gemological Institute of America (GIA) has a colour grade from D to Z, for which the D grade denotes a diamond which is completely colourless, and ranging to a Z grade which denotes a diamond having a significant amount of unwanted colour.

Shown below is the Gemological Institute of America (GIA) colour scale, against which a colour grading is applied, with the grades shown from colourless to light.

| GIA COLOR SCALE | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- |
| D | E | F | G | H | I | J | K | L | M | N | O | P | Q | R | S | T | U | V | W | X | Y | Z |
| COLORLESS | | | NEAR COLORLESS | | | | PAINT | | | | VERY LIGHT | | | | | | | LIGHT | | | | |

Although the human visual recognition of a different diamond colour is not particularly sensitive in particular in relation to diamonds of similar grades, only a slightly change in colour can significantly affect the value of the diamond.

Several factors contribute to the colour of a diamond, the most common and important factor being impurities within a diamond. During the formation process of diamonds, impurities can be easily incorporated. Nitrogen is the most common impurity found in natural diamonds, which produces an unwanted yellow colour. The higher nitrogen content in a diamond, the deeper colour and hence lower colour grade the stone is. Boron can also affect diamond colour of a diamond, but is less common. Diamonds with boron impurity shows light blue colour. There are other impurities also affect diamond colour but they are rare.

Apart from impurities, vacancy defects within a diamond also contribute to colour of a diamond. There are different forms of vacancies, such as isolated vacancy, multivacancy complex, and vacancy combining with impurities, etc.

In some diamonds, due to the ambient pressure conditions during the formation process deep in the earth, the carbon atoms may not form ideal tetrahedral structures, and the tetrahedral structures may be deformed. Such crystal deformation remains in natural diamond can also cause colour changes. For the assessment on the colour of a diamond, the most accepted industry standard and practice to determine a diamond's colour is by trained human eyes.

Using GIA as an example, colour grading personnel are trained for several months utilising standard master stones from a master stone set with assorted colour grades. Moreover, during the colour grading process, a diamond under assessment is compared with the master stones side by side in a controlled environment.

The controlled environment is a standard light box with a white tile to place behind the master stones and testing diamond as a backdrop. Under this standardized environment, the colour of a diamond can be graded by referring it to the master stone with the nearest colour.

A diamond is typically viewed from below at about 45 degrees to the pavilion, with a colour grader looking primarily at the pavilion of the diamond and in a direction towards the table of the diamond.

Repetitive training of colour graders is applied, with a view so that different graders can reproduce the same assessment results, with a view to providing uniformity and consistency between colour grading personnel. Although such a colour grading process is extensively used and under this strict colour grading procedures, the reliability and repeatability of the colour grading methodology are still prone to inconsistencies, and such inconsistencies can cause incorrect grading which can adversely impact upon the value of a diamond.

OBJECT OF THE INVENTION

It is an object of the present invention to provide a system and a process for ascertaining colour of a gemstone, in particular a diamond, which overcomes or at least partly ameliorates at least some deficiencies as associated with the prior art.

SUMMARY OF THE INVENTION

In a first aspect, the present invention provides a process operable using a computerized system for grading the colour of a diamond, wherein the colour of the diamond is correlated with the colour of a diamond of a plurality of diamonds each having a colour grading assigned thereto, the computerized system including an optical image acquisition device, a processor module and an output module operably interconnected together, said process including the steps of:

(i) acquiring via an optical image acquisition device at least a first optical image of the table of a diamond, wherein the first optical image is acquired at a predetermined angle of with respect to the central axis extending normal to the table and through the apex of the pavilion of the diamond and in a direction of towards the table and wherein the first optical image is acquired in an environment having a predetermined constant light level;

(ii) in a processor module comparing data derived from acquisition of the at least a first optical image with a plurality of data sets each of which corresponds to a diamond of a plurality of diamonds, wherein data sets are each derived from an optical image of the table of the plurality of diamonds acquired by an optical image acquisition device in an environment having a predetermined constant light the same as that as (i) and each of the data sets is assigned a colour grading, and wherein said data derived from acquisition of the at least a first optical image and the data of said data sets is data indicative of the colour of the diamond from which it is acquired; and (iii) from an output module, responsive to a predetermined threshold of correlation between the data derived from input of the first optical image and one of the plurality of data sets from step (ii), an output signal is provided indicative of the colour grade of the diamond.

Preferably, the first optical image is acquired at an angle in the range of from zero degrees to 90 degrees with respect to said central axis.

The plurality of first optical images may be acquired at varying angles with respect to said central axis, and the colour of the table of the diamond is determined by as a function of the plurality first optical images.

Each of the data sets may each derived from a plurality of optical images of the diamond of a plurality of diamonds. The optical images of the table of a plurality of diamonds are preferably acquired at an angle in the range of from zero degrees to 90 degrees with respect to said central axis. The plurality of optical images of each of the plurality of diamonds may be acquired at varying angles with respect to said central axis, and wherein the colour of each of the plurality diamonds is determined as a function of the plurality of optical images of each diamond of the plurality of diamonds.

Preferably, the process further comprises the step of acquiring at least one second optical image of the diamond, wherein the at least one second optical images is acquired at predetermined angle of with respect to the central axis, and wherein the at least one second optical image is an image of the pavilion of the diamond.

The output signal indicative of the colour may be provided upon said predetermined threshold of correlation between the data derived from input of the at lease optical image and one of said plurality of data sets; and is provided upon a predetermined threshold of correlation between the data derived from input of the at least one second optical image with a plurality of data sets each of which corresponds to the diamonds of said plurality of diamonds, wherein data sets are each derived from an optical image of the pavilion of the plurality of diamonds acquired by an optical image acquisition device in an environment having a predetermined constant light the same as that as when the at least one second optical image is acquired.

The at least a first optical image of the diamond may be divided two or more sub-regions by the processor, and the average colour of each sub-region is determined and a colour grading is assigned to each sub-region, and a final colour grading of the diamond is determined based on a weighting between the colour grading of the two or more sub-regions. The first sub-region and the second sub-regions may be of approximately the same size.

Preferably, data derived from acquisition of the at least a first optical image and the data of said data sets is RGB (Red, Green, Blue) data of the RGB colour model. The data derived from acquisition of the at least a first optical image and the data of said data sets may be HSL (Hue, Saturation, Lightness) data.

The at least a second optical image of the diamond may be divided two or more sub-regions by the processor, and the average colour of each sub-region is determined and a colour grading is assigned to each sub-region, and a final colour grading of the diamond is determined based on a weighting between the colour grading of the two or more sub-regions. The first sub-region and the second sub-regions may be of approximately the same size.

Preferably data derived from acquisition of the at least a second optical image and the data of said data sets is RGB (Red, Green, Blue) data of the RGB colour model. Data derived from acquisition of the at least a second optical image and the data of said data sets is HSL (Hue, Saturation, Lightness) data.

Preferably the at least one second optical image and the optical images of the plurality of diamonds are acquired at an angle of inclination in the range of from 30 degrees to 60 degrees with respect to the central axis. The at least one second optical image and the optical images of the plurality of diamonds may be acquired at an angle of inclination in the range of from 40 degrees to 50 degrees with respect to the central axis. The at least one second optical image and the optical images of the plurality of diamonds are acquired at an angle of inclination of about 45 degrees with respect to the central axis. Preferably, the at least a first optical image and the optical images of the plurality of diamonds are acquired within a system of a pair of integrating spheres.

Preferably, a light source providing said predetermined light level is selected from the group including an LED (Light Emitting Diode) light source, a Xeon lamp light source, and incandescent light source, and fluorescent lamp light source, a solar simulator or the like.

Preferably, the plurality of diamonds are standard reference diamonds of a master set, corresponding to a pre-existing colour grading system. The pre-existing colour grading system may be the Gemological Institute of America (GIA) colour grading system.

A plurality of optical images of the diamond may be acquired annularly about said central axis, and the colour grading may be determined from an average of the colour grading determined for each optical image acquired. The plurality of optical images may be acquired and equal annular intervals about said central axis.

In a second aspect, the present invention provides a computerized system for grading the colour of a diamond, wherein the colour of the diamond is graded based on a predetermined threshold of correlation of colour of a diamond with the colour of a diamond of a plurality of diamonds each having a colour grading assigned thereto, the computerized system including:

an optical image acquisition device for acquiring at least a first optical image of a diamond, wherein the first optical image of the table of the diamond is acquired at a predetermined angle of inclination to the central axis extending normal to the table and through the apex of the pavilion of the diamond and in a direction of towards the table and wherein the first optical image is acquired in an environment having a predetermined constant light level;

a processor module for comparing data derived from acquisition of the at least a first optical image with a plurality of data sets each of which corresponds to a diamond of a plurality of diamonds, wherein data sets are each derived of the table of the plurality of diamonds from an optical image acquired by an optical image acquisition device in an environment having a predetermined constant light the same as that as the first optical image is acquired and each of the data sets is assigned a colour grading, and wherein said data derived from acquisition of the at least a first optical image and the data of said data sets is data indicative of the colour of the diamond from which it is acquired; and an output module, for responsive to a predetermined threshold of correlation between the data derived from input of the first optical image and one of the plurality of data sets, providing an output signal indicative of the colour grade of the diamond.

The processor module may include a data store, said data store including said plurality of data sets for the plurality of diamonds.

The processor module may be located at a location remote to the optical image acquisition device and the output module, and is in communication with the optical image acquisition device and the output module by way of a telecommunications network.

The optical image acquisition device may be inclined at an angle in the range of from zero degrees to 90 degrees with respect to the central axis.

The computerized system may further comprise a second optical image acquisition device for acquiring at least a second optical image, wherein the second optical image is an optical image of the pavilion of the diamond. The processor module may be for further comparing data derived from acquisition of the at least a second optical image with a plurality of data sets each of which corresponds to said diamond of a plurality of diamonds, wherein data sets are each derived of the pavilion of the plurality of diamonds from the second optical image acquired by the second optical image acquisition device in an environment having a predetermined constant light the same as that as the first optical image is acquired; and the output module, for responsive to a predetermined threshold of correlation between the data derived from input of the first optical image and one of the plurality of data sets and a predetermined threshold of correlation between the second optical image and then plurality of datasets, providing the output signal indicative of the colour grade of the diamond.

The second optical image acquisition device may be inclined at an angle in the range of from 40 degrees to 50 degrees with respect to the central axis, and more preferably inclined at an angle of about 45 degrees with respect to the central axis. The second optical image acquisition device is located at a distance of in the range of 100 mm and 300 mm from the diamond. The second optical image acquisition device may be located at a distance of about 200 mm from the diamond.

The computerized system may further comprise at least one light source for providing said predetermined constant light level is of colour temperature 6500K. The light source may be selected from the group including an LED (Light Emitting Diode) light source, a Xeon lamp light source, and incandescent light source, and fluorescent lamp light source, a solar simulator or the like.

The computerized system preferably further comprises system of a pair integrating spheres, in which the diamond is located when the image of the diamond is acquired, and wherein the diamond is located at an aperture interconnecting each sphere of the integrating sphere system.

Preferably, a light source is provided in each of the spheres.

The computerized system may further comprise a rotational platform rotatable about said central axis and within the system of integrating spheres, wherein the rotational platform provides for rotation of the diamond about the central axis such that a plurality of optical images of the diamonds can be acquired by the optical image acquisition devices.

Preferably, the optical image acquisition device is a digital camera.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

DETAILED DESCRIPTION OF THE DRAWINGS

Figure 1:
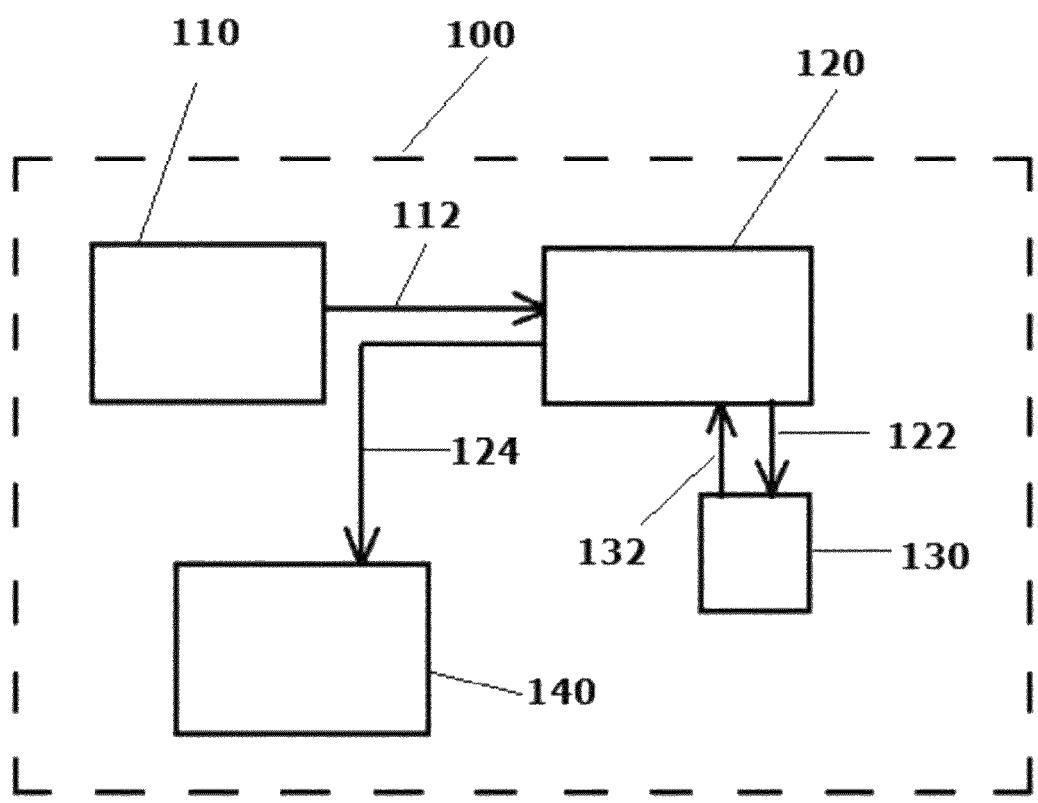
FIG. 1 shows a schematic represent of a first embodiment of a system according to the present invention.

The present inventors have identified shortcomings in the manner in which colour grading of diamonds is performed, and upon identification of the problems with the prior art, have provided a system and process which overcomes the problems of the prior art, and provides a system and process for colour grading of gemstones, in particularly diamonds, which is more consistent and reliable.

Problems identified by the present inventors include as follows:

(i) Intrinsic Factors—Reference Master Stones

For the standard reference of colour grades, the master stones are required to be with very high accuracy and repeatability among different sets. As it is very difficult to select master stones from natural diamonds in large amounts matching the standard colours and other physical requirements, the master stones can be real or alternatively synthetic diamonds, zirconia or other materials considered appropriate. Regardless of the material which the master stones are formed from, they must be of the same size and of the same cut within the same set.

However, as diamonds requiring colour grading inherently have different sizes, in order for. an appropriate comparison to be made by a diamond grader, a master stone set with similar sizes to the diamond being assessed should be used so as to reduce optical comparison error.

Inherently, it is very expensive and commercially impractical to have sets of master stones covering a range so as to cover all sizes of diamonds for assessment.

Further and more importantly, each master stone of a grading set must be homogenously saturated with the specific standard colour in order that a best comparison may be made between a stone to be graded and the reference stone of the grading set.

The accuracy and usability of master stones are not only applicable to different sets of master stones, but also the same sets of master stones at different points in time when assessment is made. As such, the colour of the master stones must be permanent and without any changes over time, otherwise it is necessary to provide useable lifetimes to the master stones.

After the expiration of the usable or serviceable lifespan of a master stone, there is no guarantee that the colour will remain stable, and consequently no guarantee as to the accuracy and repeatability of colour grading assessment.

All of the above-mentioned issues affect accuracy and repeatability in colour grading, and give rise to high technical difficulties and hence high production cost of preparation of master stone sets for colour grading.

(ii) Extrinsic Factors—Environmental Issues

Even with the most reliable master stones and within the guaranteed lifetime such that variance due to intrinsic factors is minimised, inherently the reliability and repeatability due to colour grading and assessment being done using human eyes, this will still pose an issue to the correct colour grading of a diamond.

Colour perception is a common psychological effect on human colour vision. Any differences or variations in the background colour and the lighting conditions, can contribute to errors being induced in colour grading of gemstones. As such, environmental parameters may also have a significant effect on colour grading.

(iii) Extrinsic Factors—Human Error Inconsistency and Perception

Due to the physiological effect of human being's vision, tiredness and different judgements on the same diamond may also be made before and after assessments on many different stones, even by the same colour grader person.

As such, assessment of colour of the same diamond by the same person at a different time, may result in different assessment and produce colour grade deviation.

Even with strictly controlled environment and a well-rested person, the physical properties of a diamond can also affect the colour grading. The cut of a diamond can introduce physical effect on colour judgement and assessment.

The very high refractive index of diamonds causes total internal reflection and dispersion of light, which can also affect accurate colour grading by a person. The cut varies between different diamonds so there are no corresponding master stones for every diamond cut for fair comparison.

Therefore, under standardized training and assessment procedures, professional colour graders still face difficulty for the reliability and repeatability because of the psychological, physiological, and physical effects.

(iv) Consumer View Factors

For the consumer's point of view, the pavilion view is not the most obvious part of the diamond, and not representative of the view of a diamond typically observed by a consumer.

The most obvious part of a diamond is the table of the diamond, and not the pavilion facets as utilized typically in colour assessment of diamonds in the art.

Moreover, for most articles of jewellery, diamonds are mounted with the tables facing outwardly, which typically makes the pavilion facets not seen by people. Furthermore, pavilion facets are typically obscured by a setting such as claws, prongs and bezels.

As such, colour grading from the pavilion view as used in the prior art does not truly reflect the true perceptual colour seen by consumers of a diamond when mounted and observed as is intended with an article of jewellery.

(v) Physical Factors

There exist other physical factors affecting diamond colour grading from the pavilion view of the prior art, leading to an insufficient colour grading process.

One such factor is that the light directly from the white light source is reflected by the pavilion facets outside the diamond. This reflected light can affect the accuracy of colour grading as the facets reflecting the light appears paler in colour.

Furthermore, when viewing pavilion facets, multiple facets are typically seen which are at different angles to each other, causing different impressions of colour during optical assessment.

Still further, a pavilion facet is quite elongate and has a high aspect ratio, which compromises colour perception from optical viewing and the impression of colour.

Figure 6A:
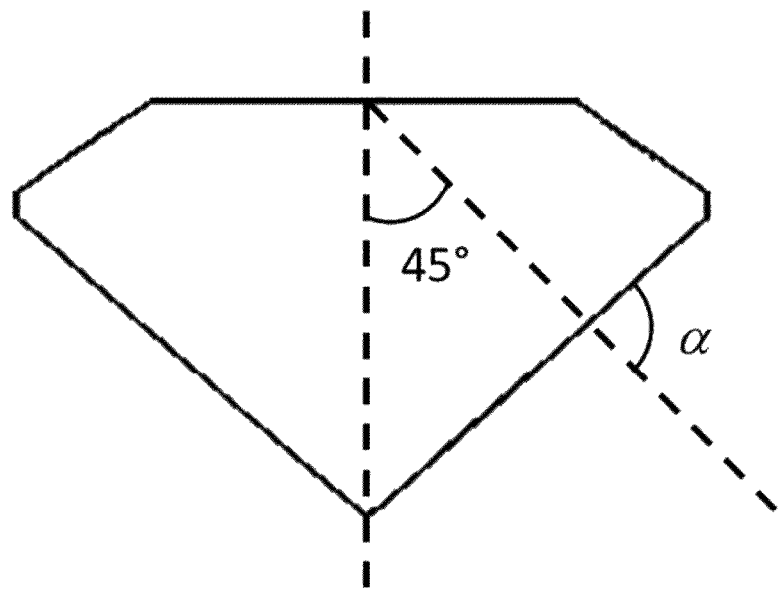
FIG. 6a and FIG. 6b show a comparison between viewing angle with respect to pavilion facets with diamonds of difference cuts.
Figure 6B:
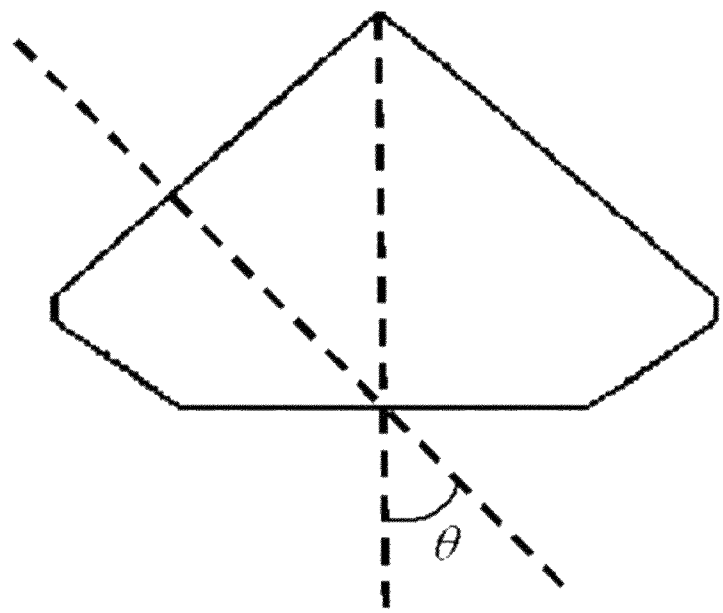

Another factor concerning the colour grading is the diamond cut. For round brilliant cut diamond for example, there are certain ratios between the crown height, pavilion depth, crown angle, pavilion angle, girdle thickness, and the like, for an excellent cut diamond. When comparing one diamond with another, the concern is lessened if the diamonds graded are all excellent and same cut. However, there exist diamonds with cut deviating from nominal ratios, the angle with respect to the pavilion surface maybe different as shown in FIGS. 6a and 6b below. Therefore, in view of the pavilion of the diamond being viewed at a different angle, such diamonds can have different colour appearance.

Furthermore, a similar variation in colour effect is also present when using such a pavilion-oriented colour assessment process of the prior art, for diamonds having a cut other than the round brilliant cut.

Apart from round brilliant cut diamonds, diamonds can also be cut in different fashions, such as Princess, Oval, Marquise, Pear shaped, Cushion, Emerald, Asscher, Radiant and Heart shaped cuts and the like. The light coming out from pavilion at 45 degrees inherently is no longer representative in comparison with a master set having a different pavilion angle. As such, the colour of such other diamonds is to be graded at different directions.

Present Invention

To provide a repeatable and reliable colour grading which also has greater and more appropriate correlation to the consumer's view of a diamond from at least an "in use" standpoint, the present invention provides a superior new and innovative process for assessment and grading of colour of a diamond with respect to colour grading processes of the prior art.

In order to overcome at least the above deficiencies of the prior art as identified by the present inventors, the new and innovative process and system for embodying such a process utilises the of viewing of colour from the table of the diamond.

Advantageously, as provided by embodiments of the present invention, the present inventors have found that by utilising two interconnected integrating spheres to provide an environment in which images of the diamond, in particular of the table, the sparkling effect of the diamond can be substantially obviated such that it is possible to acquire an appropriate and useful optical image of the table of the diamond for colour assessment.

Furthermore and advantageously, the table facet is typically the largest facet of a diamond and most prominent and generally has a low aspect ratio, thus providing a sound basis and region for the assessment of colour of a diamond, in addition to being more appropriate than using pavilion facets from "in use" and consumer standpoints.

As will now be understood, the viewing arrangement and process of utilising the table of a diamond can provide numerous advantages over the traditional colour grading methods of the prior art, and very importantly, seeing colour from table can give the most accurate grading with respect to consumers' perception of colour of a diamond. In view of diamond colour grading having a large influence on the value of a diamond, the present invention provides substantial commercial advantages.

Still further, as the colour of the diamond is viewed from the table, the light reflections such as those from pavilion facets can be minimised. Accordingly, and as the colour can be ascertained from a single and large facet, this gives less distraction for colour analysis and subsequent determination of a colour grading.

The table is typically universal in most diamonds and as such, use of a table for colour assessment as provided by the present invention advantageously allows for colour assessment and grading of diamonds of different cuts and as such, the present invention also provides for a universal colour assessment scheme amongst diamonds of different cuts.

Similarly, as for round brilliant cut, as the table is flat, there is no variation for different grades of cut in comparison with utilisation of the pavilion facets, which is the predominant methodology globally for colour grading using the GIA colour grading process. Accordingly, the present invention allows for greater independent colour grading irrespective of the influence of cut of a diamond.

Also, unlike processes of the prior art, the present invention obviates the necessity to have multiple sets of master stones for different size and different types of diamonds.

Furthermore, as different cuts of diamond inherently have a different pavilion angle, when using the colour assessment and grading process of the prior art whereby the pavilion facets are viewed at 45 degrees to the axis extending normal to the table of the diamond, the angle of inclination with respect to the plane of the pavilion facet varies as a function of pavilion angle, which affects the colour representation of the diamond.

However, as provided by the present invention, as the planar table facet is utilized for colour assessment, for a certain viewing angle with respect to the table in the table down orientation, the present invention it can reproduce the colour viewing at 45° from the pavilion view. A difference as provided by the present invention includes the improvement of light reflection from the pavilion facets. Accordingly, a *nexus* between the traditional pavilion view colour grading method of the prior art by the GIA process and table view colour grading method of the present invention can also be provided, which may be utilised for comparative purposes or as a reference if required.

The present invention is, in addition to applicable for colour determination and colour grading of white or clear diamonds, advantageously is also applicable for colour determination and grading of fancy or coloured diamonds.

To overcome these repeatability and reliability difficulties, the present inventors have provided a system and process to reliably, repeatedly and consistently grade the colour of a diamond, which obviate the above intrinsic and extrinsic factors which affect the assessment when grading the colour of a diamond, as well as advantageously provides a system and process which overcomes consumer view factors and provides a more useful colour assessment and grading process than provided by the prior art.

Referring to FIG. 1, there is shown a schematic represent of a first embodiment of a system 100 according to the present invention. The system 100 includes at least one optical image acquisition device 110 in communication 112 with a processor module including processor 120, which is in communication 122, 132 with a data store 130. An output device 140 is provided, which is in communication 124 with the processor 120.

The optical image acquisition device 110 is preferably a digital camera device of CCD, which allows for acquisition of an optical image of the table of a diamond.

The system 100 may be provided as a single unit and with the integers of the system 100 being provided as an integral device. Alternatively, the integers of the system 100 can be provided separately, and the processor 120 being provided either in an adjacent location to, for example, a touch sensitive input device and visual display unit 140 or provided at a remote location and in communication with the touch sensitive input device and visual display unit 140 by way of a telecommunications network.

Further, the data store 130 may be located adjacent the processor 120 or located at a remote location and in communication with the processor 120 by way of a telecommunications network.

Figure 2:
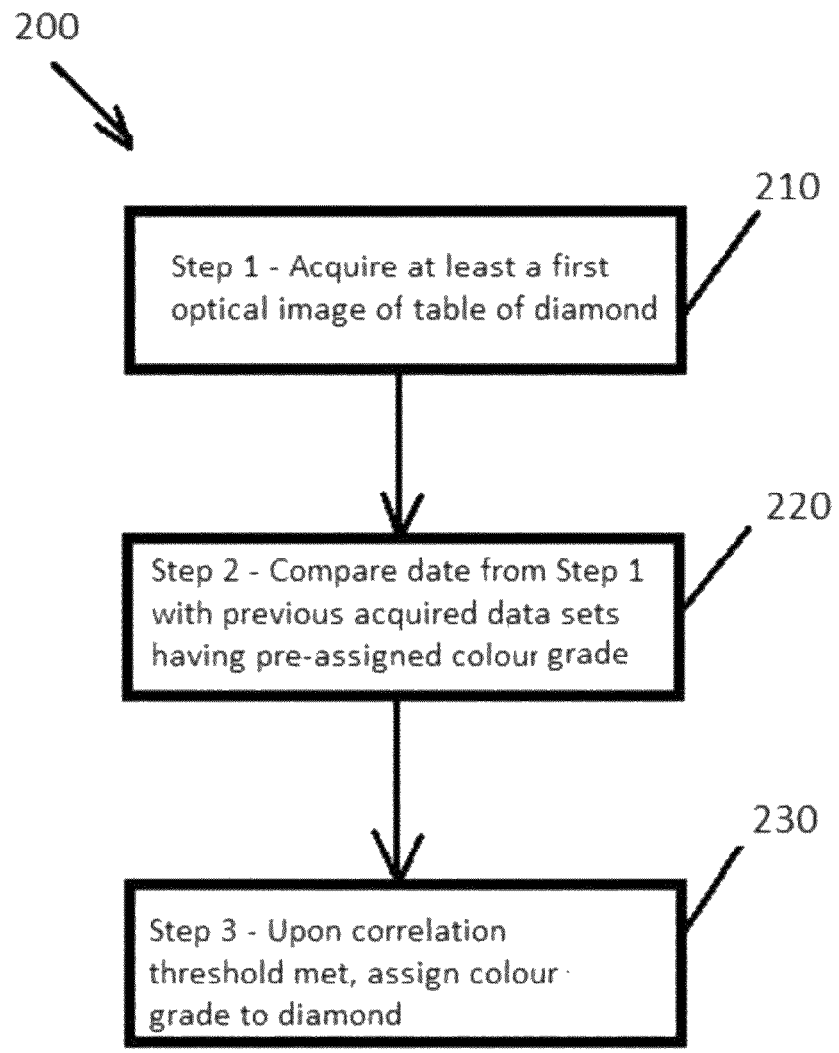
FIG. 2 shows a flow chart of the process according to the present invention.

Referring now to FIG. 2, there is shown a flow chart 200 of the process according to the present invention.

The process of the present invention is operable using a computerized system such as those as shown and described in reference to FIG. 1.

The process and as implemented in a computerized system, provides for grading the colour of a diamond.

Within the process of the present invention, the colour grading is determined or displayed based upon a predetermined threshold of correlation between data derived from input of the first optical image of the table and a data set corresponding to a diamond of a pre-assigned colour grading.

A computerized system in which the process is embodied, includes an optical image acquisition device, a processor module and an output module.

The process includes the steps of:

First Step—The first step (210) includes acquiring an optical image of the table of a diamond for which the colour grading thereof is to be determined. The optical image is acquired using an image acquisition device, such as a digital camera or CCD at a predetermined angle of inclination to the central axis extending normal to the table and through the apex of the pavilion of the diamond and in a direction of towards the table.

The optical image is acquired in an environment having a predetermined constant light level, such as within a system of two communicating integrating spheres. Optionally, an optical image can also be acquired of the pavilion facets of the diamond.

Second Step—The second step (220) includes comparing data derived from acquisition of optical image of the table of a diamond with a plurality of data sets each of which corresponds to a diamond of a plurality of diamonds, each of which has a colour grade assigned thereto.

The data sets are each derived from an optical image acquired by an optical image acquisition device in an environment having a predetermined constant light the same as that as in the First Step. Each of the data sets is assigned a colour grading which may be pre-assigned or assigned a value or grade. The data derived from acquisition of the optical image and the data of the data sets is data indicative of the colour of the diamond from which it is acquired.

Third Step—The third step (230), when a predetermined threshold of correlation between the data derived from input of the optical image of the table and one of the plurality of data sets from the Second Step, an output signal is provided indicative of the colour grade of the diamond.

For comparative purposes, the diamonds of the plurality of data sets may be derived from a set of master stones having an industrially accepted colour grade, such as from a set of GIA colour graded diamonds. Whilst the perceived colour from the pavilion of the master stones may be different to the perceived colour of a view of the diamond from the table depending upon the viewing angle with respect to the table and the geometry and dimensions of the diamond, a colour determination can be made from an image of the table of the diamonds of the master stones and the predefined colour grade assigned thereto.

Figure 3:
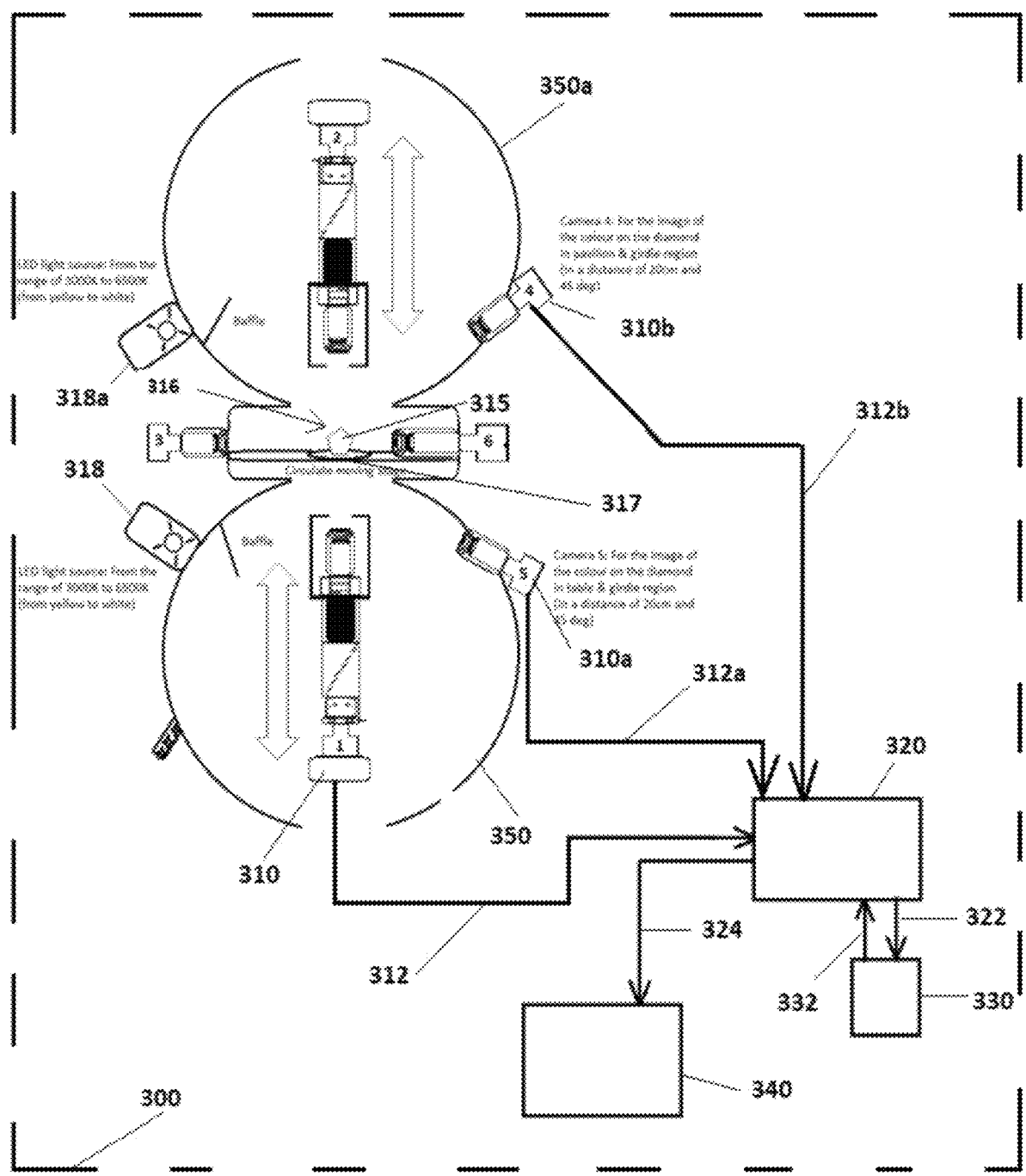
FIG. 3 shows a schematic representation of an embodiment of a system in accordance with the present invention.

Referring to FIG. 3, there is shown a schematic representation of a system 300 in accordance with the present invention. The system 300 includes two first optical image acquisition devices 310 and 310a in communication 312, 312a with a processor module including processor 320, which is in communication 322, 332 with a data store 330 which holds the plurality of data sets for the plurality of diamonds. An output device 340 is provided, which is in communication 324 with the processor 320.

The two first optical image acquisition devices 310 and 310a allow images of the table of diamond 315, which has its table facing downwards, at 90 degrees by image acquisition device 310 and at an inclination by image acquisition device 310a. As such, images at two angles to the table facet of the diamond 315 may be acquired. Alternatively, in other embodiments, the angle of inclination of the diamond 315 may be varied by a way of a holder for the diamond 315 so as to alter the viewing acquisition angle. The system 300 includes a system of integrating spheres comprised of two integrating spheres 350 and 350a in optical communication with each other at aperture region 316, in which the diamond 315 is located when the optical image is acquired.

The first optical image acquisition devices 310 and 310a are preferably digital camera devices, which allow for acquisition of an optical image of a diamond 315 at 90 degrees by acquisition device 310, and at inclined at an angle for example 45 degrees acquisition device 310a with respect to the central vertical axis of the diamond 315.

The optical image acquisition devices 310 and 310a are located at a distance of about 200 mm from the diamond 315, or less, or more.

The system 300 includes two light source 318 and 318a, providing said predetermined constant light level which is of colour temperature 6500K within each integrating sphere 350 and 350a. The light sources can be selected from the group including an LED (Light Emitting Diode) light source, a Xeon lamp light source, and incandescent light source, and fluorescent lamp light source, a solar simulator or the like, so as to provide a predetermined constant light level within the spheres 350 and 350a of colour temperature 6500K.

The system 300 further includes a rotational platform 317 rotatable about said central axis of the diamond 315 and within the system of integrating spheres 350 and 350a, wherein the rotational platform 317 provides for rotation of the diamond 315 about the central axis such that a plurality of optical images of the diamonds can be acquired by the optical image acquisition devices 310 and 310a.

A second optical image acquisition device 310b a second optical image acquisition device is also provided for acquiring at least a second optical image, wherein the second optical image is an optical image of the pavilion of the diamond 315.

An output signal 312b indicative of the colour is provided upon a predetermined threshold of correlation between the data derived from input of the at least first optical image and one of said plurality of data sets.

Upon a predetermined threshold of correlation between the data derived from input of the at least one second optical image 312b with a plurality of data sets each of which corresponds to the diamonds of said plurality of diamonds, wherein data sets are each derived from an optical image of the pavilion of the plurality of diamonds acquired by an optical image acquisition device in an environment having a predetermined constant light the same as that as when the at least one second optical image is acquired, an output signal indicative of the colour can be provided.

The first optical image of the table of the diamond can divided two or more sub-regions by the processor 320, and the average colour of each sub-region can determined and a colour grading is assigned to each sub-region, and a final colour grading of the diamond is determined based on a weighting between the colour grading of the two or more sub-regions.

Figure 4A:
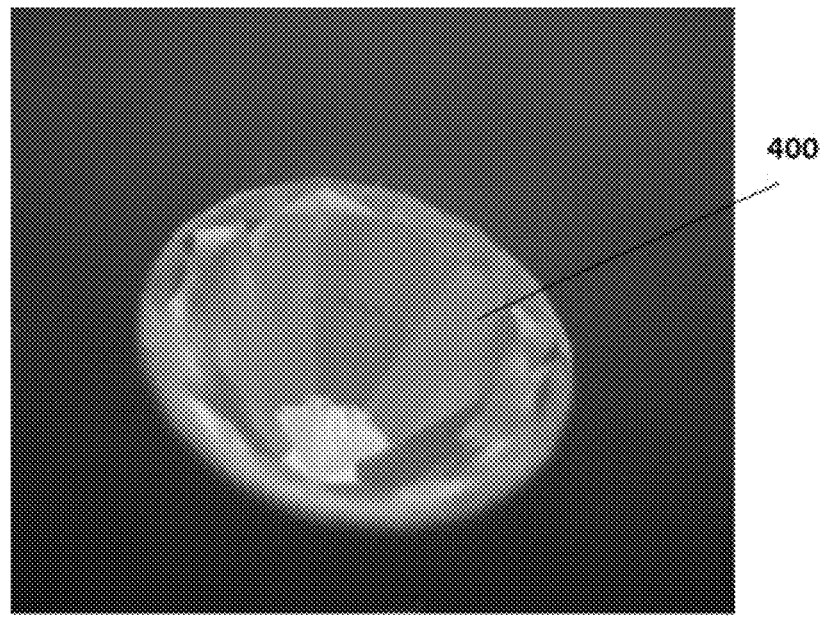
FIGS. 4a and 4b show photographic representation of a diamond as an acquired optical image in accordance with the present invention.
Figure 4B:
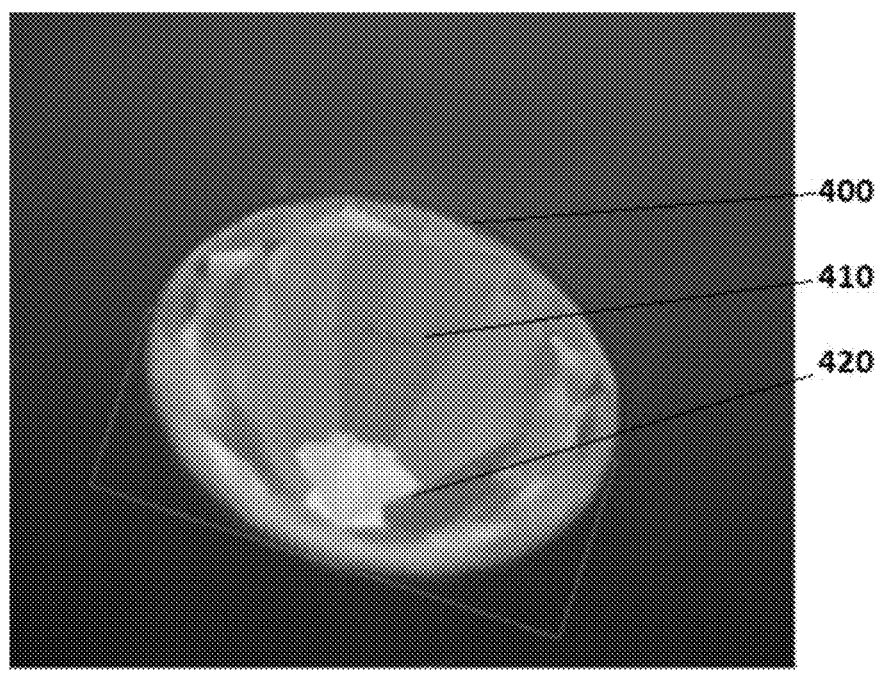

Further, an optical image of the pavilion of the diamond 315 may divided two or more sub-regions by the processor 320, and the average colour of each sub-region is determined and a colour grading is assigned to each sub-region, and a final colour grading of the diamond is determined based on a weighting between the colour grading of the two or more sub-regions as shown in FIGS. 4a and 4b where there is shown a photographic representation of a diamond 400 as an acquired optical image. The optical image of the pavilion of the diamond 400 is divided two or more sub-regions 410, 420 and the average colour of each sub-region 410, 420 is determined and a colour grading is assigned to each sub-region. Then, a final colour grading of the diamond is determined based on a weighting between the colour grading of the two or more sub-regions 410, 420. As shown in FIG. 4b, the optical image of the diamond 400 is divided into two sub-regions 410, 420, wherein the first sub-region 410 includes the crown region of the diamond and the second sub-region 420 includes the pavilion of the diamond. In this embodiment, the first sub-region 410 and the second sub-region 420 are of approximately the same size.

Similarly, the image of the table of the diamond may also be subdivided as described with reference to FIGS. 4a and 4b, and colour determined accordingly.

Data derived from acquisition of the optical image of the diamond 400 and the data of data sets may be RGB (Red, Green, Blue) data of the RGB colour model. Preferably as in the present embodiment, derived from acquisition of the at least a first optical image and the data of the reference data sets, is HSL (Hue, Saturation, Lightness) data.

The reference data of diamonds are standard reference diamonds of a master set, corresponding to a pre-existing colour grading system, preferably the Gemological Institute of America (GIA) colour grading system for example.

Figure 5:
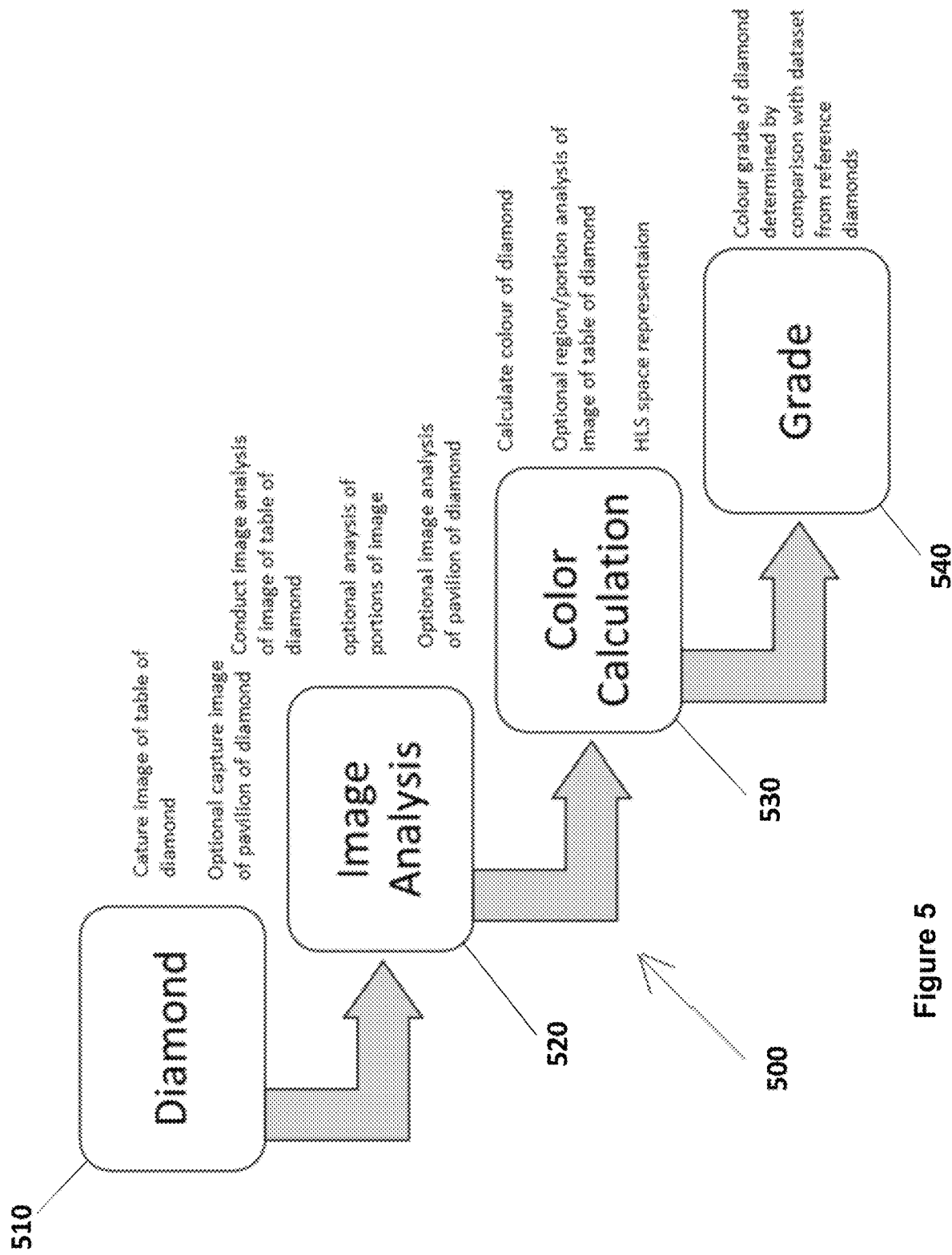
FIG. 5 shows a flow chart of an embodiment of a process according to the present invention.

FIG. 5 shows a flow chart of an embodiment of a process 500 according to the present invention.
The process includes the steps of:
Step (i) 510—capturing an image of the table of a diamond;
Step (ii) 520—conduct image analysis of captured image of the table from step (ii), and optionally analyses portions of said image. Further, optionally an image of the pavilion of the diamond may also be acquired, for comparative purposes and for reference with a standard data set;
Step (iii) 530—calculate and determine colour of diamond, optionally by portions of the image, and provide HLS space representation; and
Step (iv) 540—determine the colour grade of the diamond be comparison with dataset of reference diamonds.

The process of the present invention, in a preferred embodiment, utilize a system of integrating spheres are used to analyze the colours of diamonds that are developed. Such a system and process, can provide a good alternative with high repeatability in comparison with the systems ant\d processes of the prior art, as can also reduce the cost and time to produce master stone sets and train a professional gemologist. It can also reduce the time to train a professional gemologist. Further, it can obviate the necessity to have different sets of master stones for colour assessment of different sizes of diamonds.

Due to the visual nature of colour, the assessment on the colour a diamond needs to be done in a controlled environment. The present invention ensures that the lighting conditions and the background for every diamond assessed for colour are the same, obviating negative environmental effects.

Moreover, the controlled environment must be repeatable at different locations such that people at different location can still have the same assessment on diamond colour.

A system of integrating spheres assists in playing this role as the light intensity, spectrum and uniformity can be well controlled and repeated, and meet this requirement.

The cameras on the system of integrating spheres can solve the repeatability and reliability issues caused by human vision and the need for time-changing master stones, as colour grading and assessment is made by a processor using mathematical correlation criteria against the same "master stone" electronically acquired data, rather than human eye assessment.

As described above, utilisation of the table of a diamond for colour determination and grading provides numerous advantages over the prior art which utilizes the pavilion as the aspect for colour determination and grading.

As shown in FIG. 6a and FIG. 6b, when using a standard reference angle to the pavilion facets as is utilised in the prior art, the angle of viewing with reference to the plane of the facets changes, affecting colour determination. By contrast, the present invention provides a constant observation angle to the table for colour determination, which is irrespective of diamond cut type.

What is claimed:

1. A process operable using a computerized system for grading the colour of a diamond, wherein the colour of the diamond is correlated with the colour of a diamond of a plurality of diamonds each having a colour grading assigned thereto, the computerized system including an optical image acquisition device, a processor module and an output module operably interconnected together, said process including the steps of:
   (i) acquiring via an optical image acquisition device at least one first optical image of a table of a diamond, wherein the at least one first optical image is acquired at a predetermined angle with respect to a central axis extending normal to the table and through an apex of a pavilion of the diamond and in a direction of towards the table and wherein the at least one first optical image is acquired in an environment having a predetermined constant light level;
   (ii) in a processor module comparing data derived from acquisition of the at least one first optical image with a plurality of data sets each of which corresponds to a diamond of a plurality of diamonds, wherein the plurality of data sets are each derived from an optical image of the table of the plurality of diamonds acquired by an optical image acquisition device in an environment having a predetermined constant light level the same as the predetermined constant light level used in acquiring the at least one first optical image and each of the plurality of data sets is assigned a colour grading, and wherein said data derived from acquisition of the at least one first optical image and the data of said plurality of data sets are data indicative of the colour of the diamond from which it is acquired; and
   (iii) from an output module, responsive to a predetermined threshold of correlation existing between the data derived from acquisition of the at least one first optical image and data derived from one of the plurality of data sets, generating an output signal indicative of the colour grade of the diamond.

2. A process according to claim 1, wherein the first optical image is acquired at an angle in the range of zero degrees to 90 degrees with respect to said central axis.

3. A process according to claim 2, wherein a plurality of first optical images are acquired at varying angles with respect to said central axis, and the colour of the table of the diamond is determined as a function of the plurality first optical images.

4. A process according to claim 1, wherein each of the plurality of data sets are each derived from a plurality of optical images of the diamond of a plurality of diamonds; and wherein the optical images of the table of a plurality of diamonds are acquired at an angle in the range of zero degrees to 90 degrees with respect to said central axis.

5. A process according to claim 4, wherein a plurality of optical images of each of the plurality of diamonds are acquired at varying angles with respect to said central axis, and wherein the colour of each of the plurality diamonds is determined as a function of the plurality of optical images of each diamond of the plurality of diamonds.

6. A process according to claim 1, further comprising a step of acquiring at least one second optical image of the diamond, wherein the at least one second optical image is acquired at predetermined angle with respect to the central axis, wherein the at least one second optical image is an image of the pavilion of the diamond, wherein the output signal indicative of the colour is generated upon said predetermined threshold of correlation existing between the data derived from acquisition of the at least one first optical image and one of said plurality of data sets; and is provided upon a predetermined threshold of correlation existing between the data derived from input of the at least one second optical image with a plurality of data sets each of which corresponds to the diamonds of said plurality of diamonds, wherein the plurality of data sets are each derived from an optical image of the pavilion of the plurality of diamonds acquired by an optical image acquisition device in an environment having a predetermined constant light level the same as the predetermined constant light level used when the at least one second optical image is acquired.

7. A process according to claim 1, wherein the at least one first optical image of the diamond is divided into two or more sub-regions by the processor module, and an average colour of each sub-region is determined and a colour grading is assigned to each sub-region, and a final colour grading of the diamond is determined based on a weighting between the colour grading of the two or more sub-regions.

8. A process according to claim 1, wherein said data derived from acquisition of the at least one first optical image and the data of said plurality of data sets is RGB (Red, Green, Blue) data of the RGB colour model.

9. A process according to claim 8, wherein said data derived from acquisition of the at least one first optical image and the data of said data sets data sets is HSL (Hue, Saturation, Lightness) data.

10. A process according to claim 6, wherein said data derived from acquisition of the at least one second optical image and the data of said plurality of data sets is RGB (Red, Green, Blue) data of the RGB colour model.

11. A process according to claim 1, wherein the plurality of diamonds are standard reference diamonds of a master set, corresponding to a pre-existing colour grading system.

12. A process according to claim 1, wherein a plurality of first optical images of the diamond are acquired annularly about said central axis, and the colour grading is determined from an average of the colour grading determined for each optical image acquired.

13. A computerized system for grading the colour of a diamond, wherein the colour of the diamond is graded based on a predetermined threshold of correlation between the colour of a diamond with a colour of a diamond of a plurality of diamonds each having a colour grading assigned thereto, the computerized system including:

an optical image acquisition device for acquiring at least one first optical image of a diamond, wherein the at least one first optical image of a table of the diamond is acquired at a predetermined angle of inclination to a central axis extending normal to the table and through an apex of a pavilion of the diamond and in a direction of towards the table and wherein the at least one first optical image is acquired in an environment having a predetermined constant light level;

a processor module for comparing data derived from acquisition of the at least one first optical image with a plurality of data sets each of which corresponds to a diamond of a plurality of diamonds, wherein the plurality of data sets are each derived for the table of the plurality of diamonds from an optical image acquired by an optical image acquisition device in an environment having a predetermined constant light level the same as the predetermined constant light level used in acquiring the at least one first optical image first optical image and each of the plurality of data sets is assigned a colour grading, and wherein said data derived from acquisition of the at least one first optical image and the data of said plurality of data sets is data indicative of the colour of the diamond from which it is acquired; and an output module for generating an output signal indicative of the colour grade of the diamond, upon a predetermined threshold of correlation existing between the data derived from input of the at least one first optical image and data derived from one of the plurality of data sets.

14. A computerized system according to claim 13, wherein the processor module includes a data store, said data store including said plurality of data sets for the plurality of diamonds.

15. A computerized system according to claim 13, wherein the optical image acquisition device is inclined at an angle in the range of zero degrees to 90 degrees with respect to the central axis.

16. A computerized system according to claim 13, further comprising a second optical image acquisition device for acquiring at least one second optical image, wherein the at least one second optical image is an optical image of the pavilion of the diamond.

17. A computerized system according to claim 16, wherein the processor module is for further comparing data derived from acquisition of the at least one second optical image with a plurality of data sets each of which corresponds to said diamond of a plurality of diamonds, wherein the plurality of data sets are each derived from the pavilion of the plurality of diamonds from the at least one second optical image acquired by the second optical image acquisition device in an environment having a predetermined constant light level the same as the predetermined constant light level used in acquiring the at least one first optical image; and the output module, for responsive to a predetermined threshold of correlation existing between the data derived from input of the at least one first optical image and data derived from one of the plurality of data sets and a predetermined threshold of correlation existing between data from the at least one second optical image and data derived from the plurality of datasets, generating the output signal indicative of the colour grade of the diamond.

18. A computerized system according to claim 13, further comprising at least one light source for providing said predetermined constant light level is of colour temperature 6500K.

19. A computerized system according to claim 18, wherein the light source is selected from the group including an LED (Light Emitting Diode) light source, a Xeon lamp light source, and incandescent light source, and fluorescent lamp light source, a solar simulator.

20. A computerized system according to claim 13, further comprising a system including a pair of integrating spheres, wherein the diamond is located when the image of the diamond is acquired, and wherein the diamond is located at an aperture interconnecting each sphere of the pair of integrating spheres.

21. A computerized system according to claim 20, wherein a light source is provided in each of the spheres.

22. A computerized system according to claim 20, further comprising a rotational platform rotatable about said central axis and within the system of integrating spheres, wherein the rotational platform provides for rotation of the diamond about the central axis such that a plurality of optical images of the diamonds can be acquired by optical image acquisition devices.

* * * * *